(12) United States Patent
Thomas et al.

(10) Patent No.: US 8,795,876 B2
(45) Date of Patent: Aug. 5, 2014

(54) DEVICE FOR MAKING RAPID CONNECTIONS AND DISCONNECTIONS BETWEEN HIGH VOLTAGE BATTERY MODULES AND OTHER MOTOR VEHICLE SYSTEMS

(75) Inventors: John D. Thomas, Rochester, MI (US); Nam-Huan Thai-Tang, Bloomfield, MI (US); Albert W. Harrison, Detroit, MI (US)

(73) Assignee: ALTe Powertrain Technologies, Inc., Auburn Hills, MI (US)

( * ) Notice: Subject to any disclaimer, the term of this patent is extended or adjusted under 35 U.S.C. 154(b) by 305 days.

(21) Appl. No.: 12/889,781

(22) Filed: Sep. 24, 2010

(65) Prior Publication Data
US 2011/0070475 A1    Mar. 24, 2011

Related U.S. Application Data

(60) Provisional application No. 61/245,376, filed on Sep. 24, 2009.

(51) Int. Cl.
*H01M 6/42*    (2006.01)
*H01M 2/10*    (2006.01)
*B23P 11/00*    (2006.01)
*B60W 10/24*    (2006.01)

(52) U.S. Cl.
USPC ............. 429/159; 429/99; 29/428; 180/65.29

(58) Field of Classification Search
CPC ..... H01M 2/1083; H01M 2/10; H01M 10/46; B60L 11/1879
USPC ...................... 29/428; 429/120, 121, 99, 159; 180/65.1, 65.21, 65.29
See application file for complete search history.

(56) References Cited

U.S. PATENT DOCUMENTS

| | | | |
|---|---|---|---|
| 5,349,535 A | 9/1994 | Gupta | |
| 5,369,352 A | 11/1994 | Toepfer et al. | |
| 7,520,355 B2 | 4/2009 | Chaney | |
| 2002/0130125 A1 | 9/2002 | Murofushi et al. | |
| 2003/0162448 A1* | 8/2003 | Routtenberg et al. | 439/894 |
| 2004/0036444 A1 | 2/2004 | Oogami | |
| 2007/0080662 A1 | 4/2007 | Wu | |
| 2007/0259263 A1* | 11/2007 | Shibuya et al. | 429/186 |
| 2007/0284167 A1 | 12/2007 | Watanabe et al. | |
| 2008/0078596 A1 | 4/2008 | Kim et al. | |
| 2008/0283317 A1 | 11/2008 | Wagner et al. | |
| 2008/0284375 A1* | 11/2008 | Nagaoka et al. | 320/116 |
| 2009/0000835 A1 | 1/2009 | Jones et al. | |
| 2010/0071979 A1* | 3/2010 | Heichal et al. | 180/68.5 |

* cited by examiner

*Primary Examiner* — Muhammad Siddiquee

(74) *Attorney, Agent, or Firm* — Honigman Miller Schwartz and Cohn LLP

(57) ABSTRACT

A battery module for a vehicle comprises a first portion adapted to be mounted to a vehicle and a second portion mounted to a battery box. A first pair of high voltage electrical connectors is mounted to the first portion and a second pair of high voltage electrical connectors are mounted to the second portion. The first pair of high voltage electrical connectors are configured to mate with the second pair of high voltage electrical connectors. Additionally, a first general electrical connector is mounted to the first portion of the battery box and a second general electrical connector is mounted to the second portion of the battery box. The first general electrical connector is configured to mate with the second general electrical connector.

8 Claims, 15 Drawing Sheets

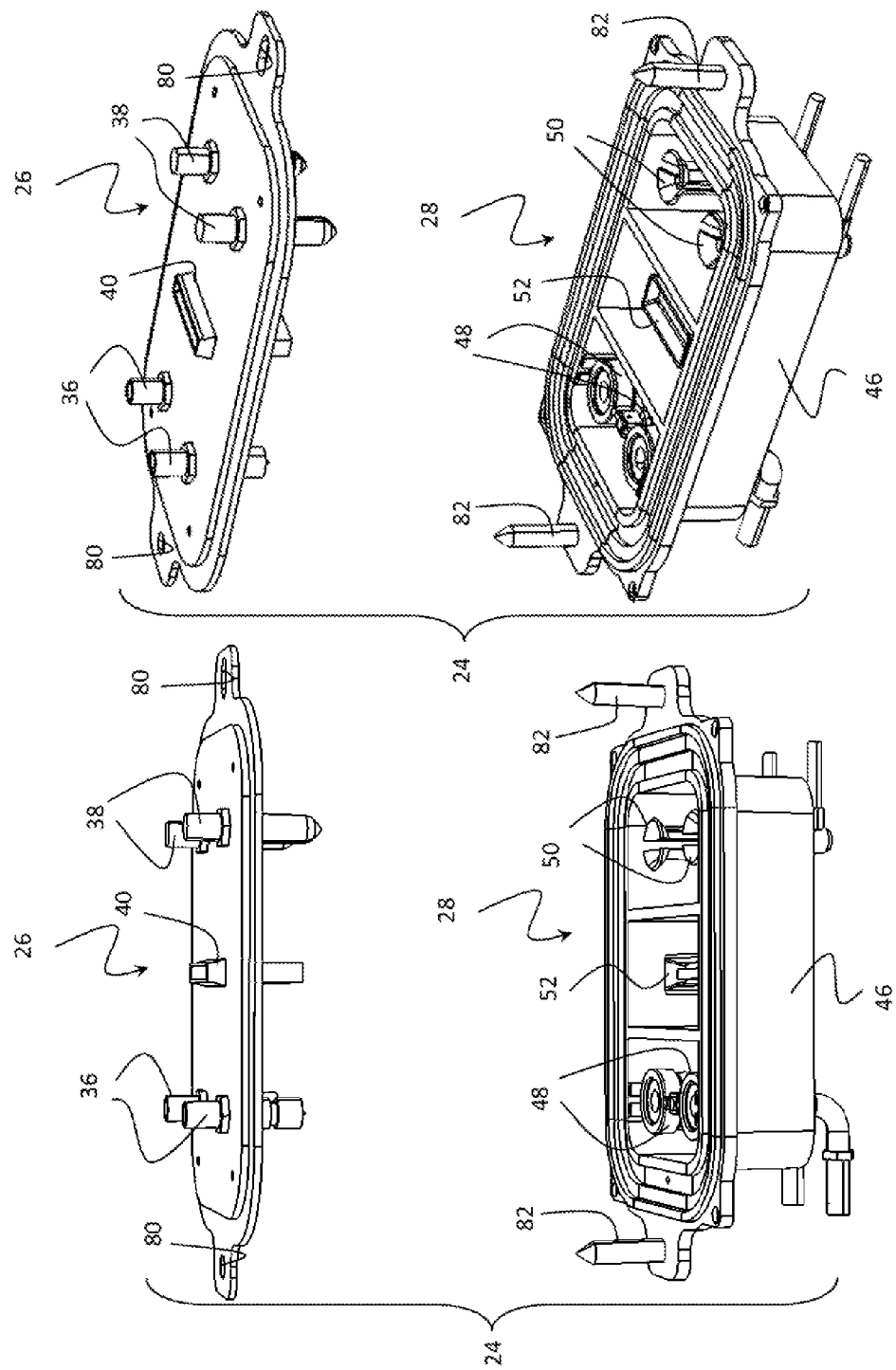

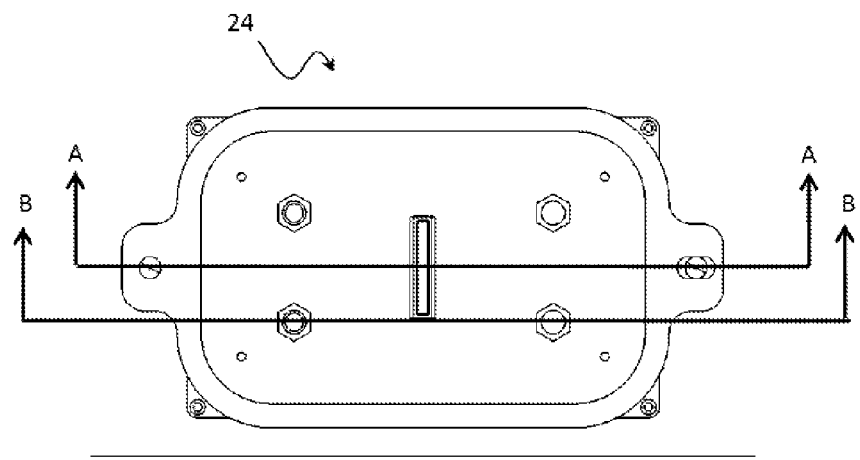
Fig. 16
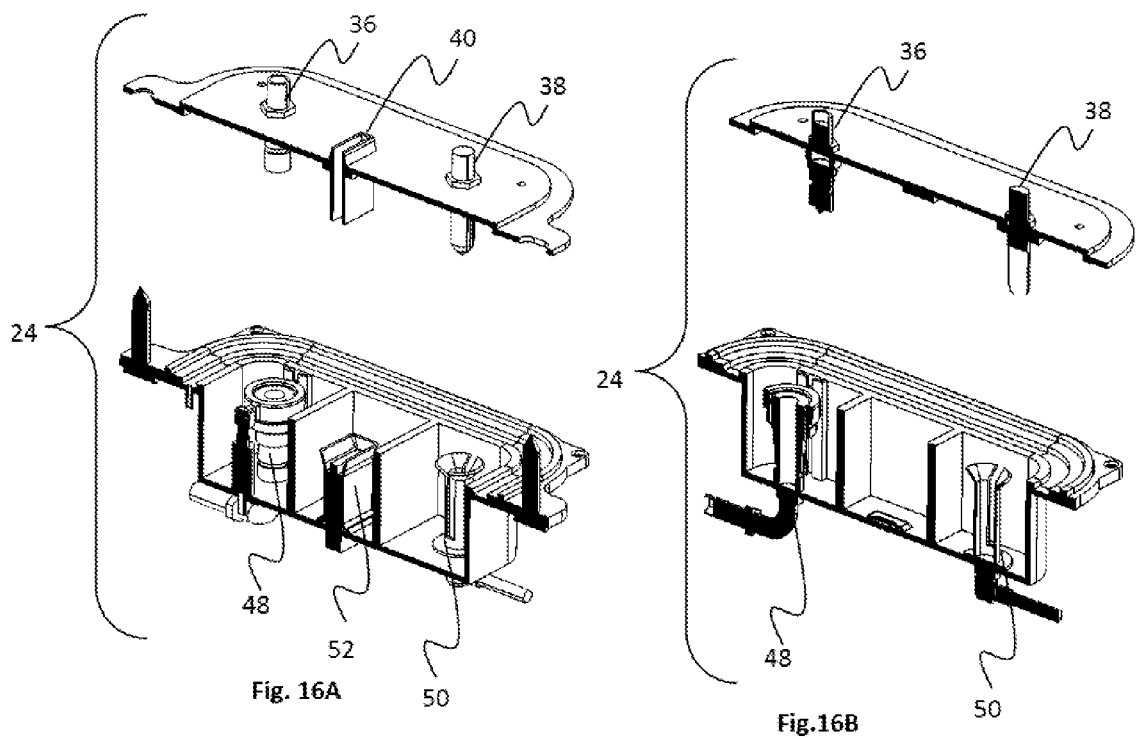
Fig. 16A
Fig. 16B

DEVICE FOR MAKING RAPID CONNECTIONS AND DISCONNECTIONS BETWEEN HIGH VOLTAGE BATTERY MODULES AND OTHER MOTOR VEHICLE SYSTEMS

CROSS REFERENCE TO RELATED APPLICATIONS

This application claims the benefit of U.S. Provisional Application Ser. No. 61/245,376 filed Sep. 24, 2009, the entire contents of which are hereby incorporated by reference.

TECHNICAL FIELD

The present invention relates, generally, to a vehicle having a battery module, and more specifically, to an arrangement and method for rapidly connecting and disconnecting the battery module.

BACKGROUND

Advancements in technology and the growing concern for environmentally efficient vehicles have led to the use of alternate fuel and power sources for vehicles. Electric vehicles or hybrid electric vehicles use energy storage systems (ESS) to provide power for various vehicle requirements. Commonly, the ESS includes a battery module which must be occasionally removed for servicing or replacement. The battery modules may also be disconnected to charge the individual batteries and then reinstalled on the vehicle.

The development of the electric vehicle has led to many different types of batteries and types of connections for physically and electrically connecting the battery to the vehicle. In addition, the battery modules typically require cooling devices and must also be fluidly connected to the cooling system for the vehicle. The physical, electrical and fluid connections for each battery module must be separately manually connected and disconnected. Battery modules are also frequently located in a difficult to reach area of the vehicle requiring removal of other components to reach the battery module. As a result of these variations, connecting the battery module is a time consuming process that differs for each vehicle model.

SUMMARY

A battery module for a vehicle comprises a first portion adapted to be mounted to a vehicle and a second portion mounted to a battery box. A first pair of high voltage electrical connectors is mounted to the first portion and a second pair of high voltage electrical connectors are mounted to the second portion. The first pair of high voltage electrical connectors are configured to mate with the second pair of high voltage electrical connectors. Additionally, a first general electrical connector is mounted to the first portion of the battery box and a second general electrical connector is mounted to the second portion of the battery box. The first general electrical connector is configured to mate with the second general electrical connector.

A method of connecting a battery module to a vehicle comprises aligning a first portion of the battery module and a second portion of the battery module with one another. The second portion of the battery module is moved towards the first portion of the battery module until a first locator on the first portion of the battery module is aligned with a corresponding second locator on the second portion of the battery module. Pressure is applied to the second portion of the battery module until the second portion of the battery module is secured to the first portion of the battery module. The second portion of the battery module is secured to the first portion of the battery module when a first pair of high voltage electrical connectors mates with a second pair of high voltage electrical connectors, and a first general electrical connector mates with a second general electrical connector.

A method of disconnecting a battery module from a vehicle comprises sending a disengagement signal to a controller for the battery, and releasing a mechanical lock between a first pair of fluid connectors mounted on a first portion of the battery module and a second pair of fluid connectors located on a second portion of the battery module. The second portion of the battery module may then be moved away from the first portion of the battery module.

The above features and advantages, and other features and advantages of the present invention will be readily apparent from the following detailed description of the preferred embodiments and best modes for carrying out the present invention when taken in connection with the accompanying drawings and appended claims.

BRIEF DESCRIPTION OF THE DRAWINGS

FIG. 10 is a perspective exploded schematic illustration of the connector assembly for the battery module assembly of FIGS. 1-9;

FIG. 11 is a second perspective exploded schematic illustration of the connector assembly for the battery module assembly of FIGS. 1-10;

FIG. 16 is a first schematic top view of the connector assembly for the battery module assembly of FIGS. 1-15;

FIG. 16A is a first cross-sectional exploded perspective schematic illustration of the second portion of the connector assembly for the battery module assembly of FIG. 16 taken along line A-A;

FIG. 16B is a first cross-sectional exploded perspective schematic illustration of the second portion of the connector assembly for the battery module assembly of FIG. 16 taken along line B-B;

DETAILED DESCRIPTION

Figure 1:
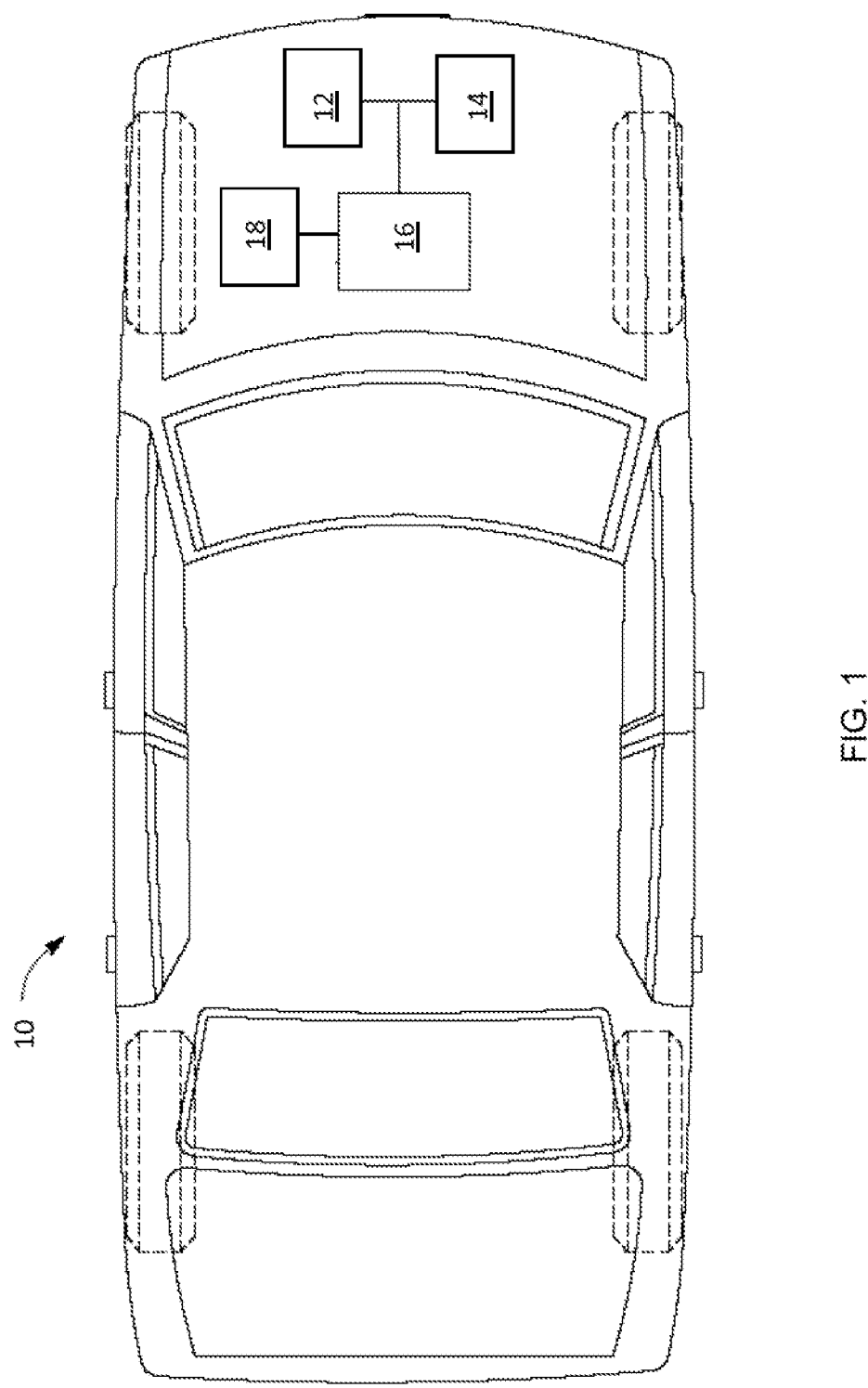
FIG. 1 is a schematic plan view illustration of an electric vehicle having an energy storage system including a battery module assembly.
Figure 2:
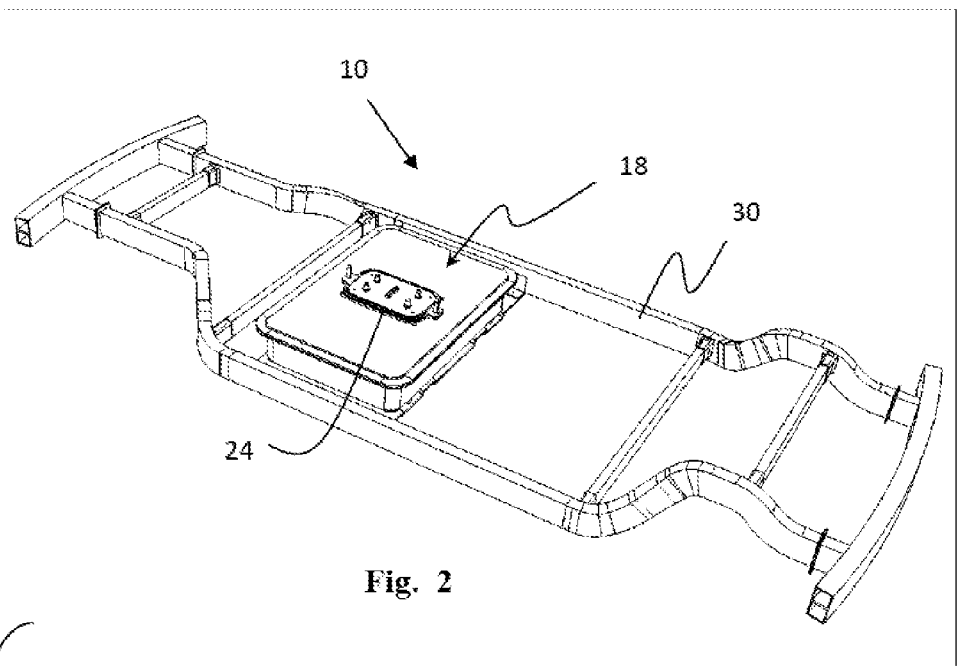
FIG. 2 is a schematic perspective illustration of a first embodiment of a battery module assembly having a connector assembly and a frame for the vehicle of FIG. 1.
Figure 3:
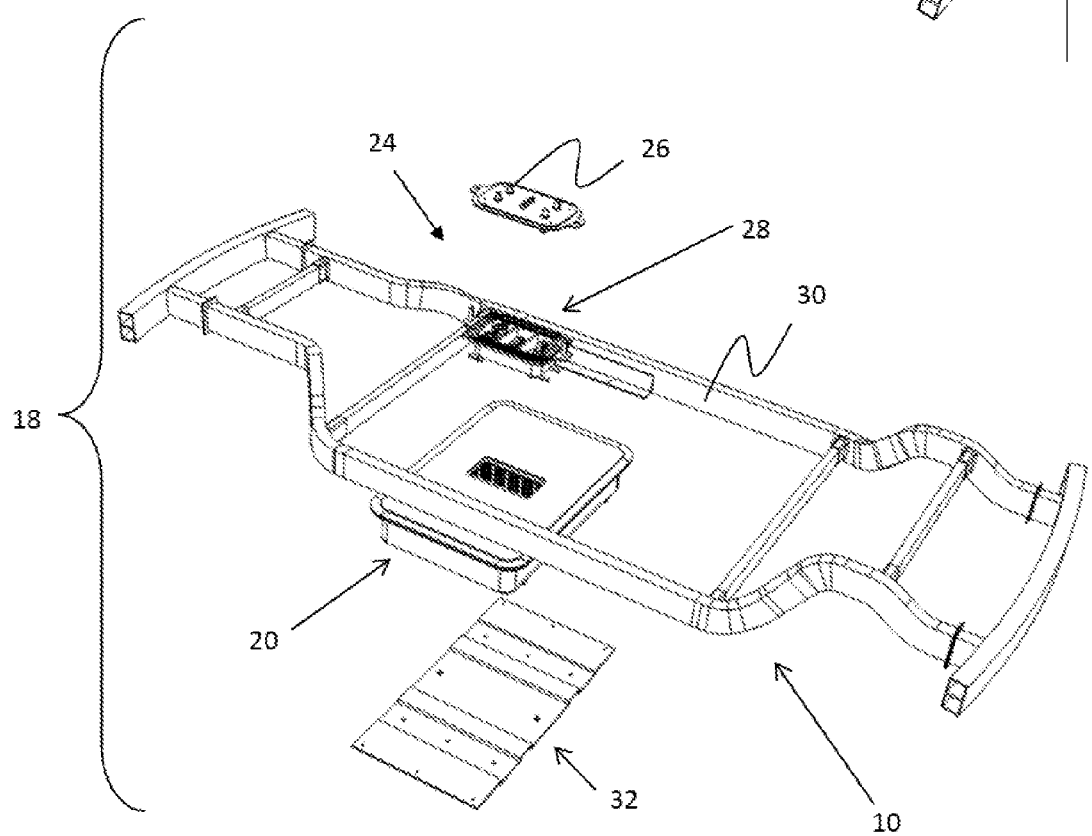
FIG. 3 is a schematic perspective illustration of an exploded view of the first embodiment of the battery module assembly and a frame for the vehicle of FIGS. 1-2.
Figure 4:
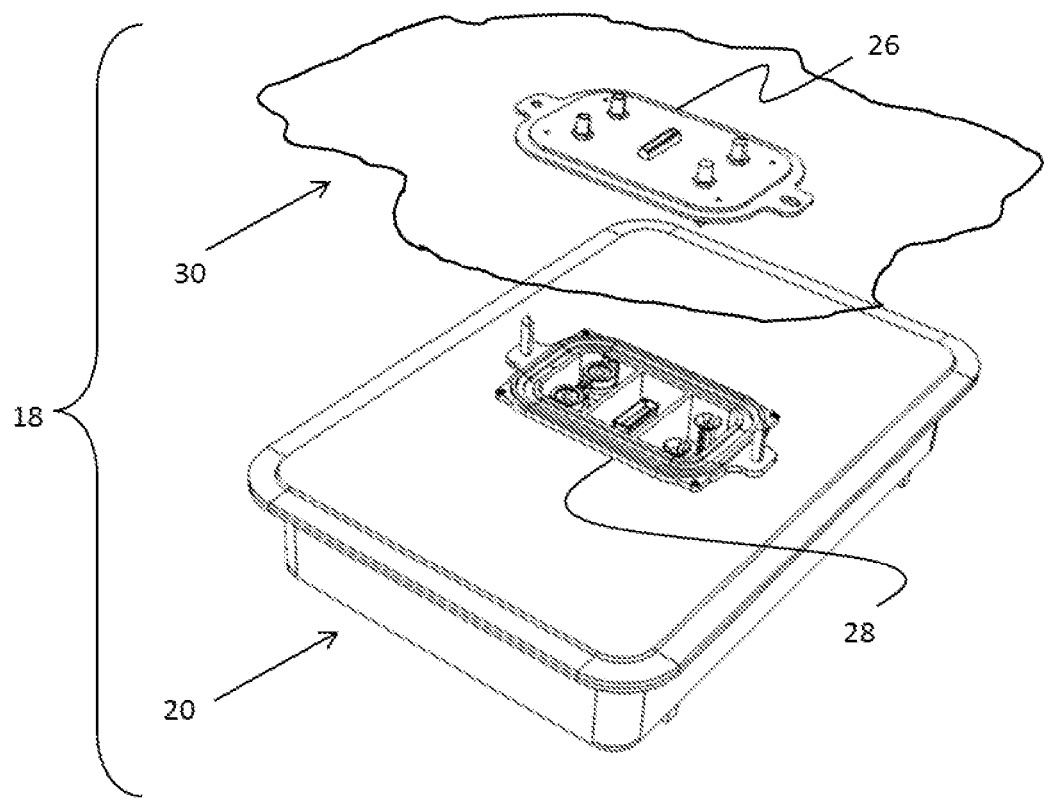
FIG. 4 is a schematic perspective illustration of an enlarged exploded view of the first embodiment of the battery module assembly disconnected from the vehicle of FIGS. 1-3.
Figure 5:
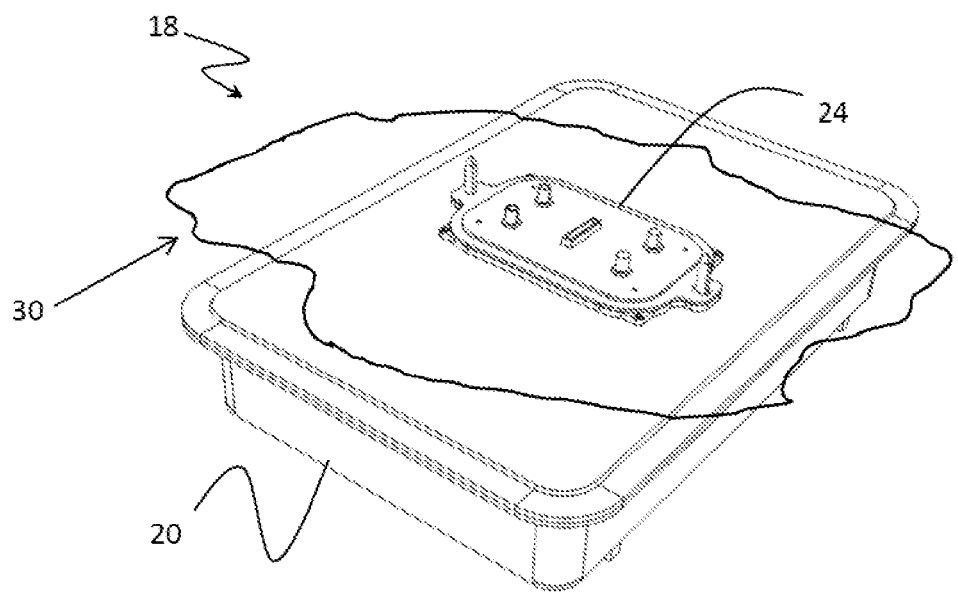
FIG. 5 is a second schematic illustration of an enlarged view of the first embodiment of the battery module assembly connected to the vehicle of FIGS. 1-4.
Figure 6:
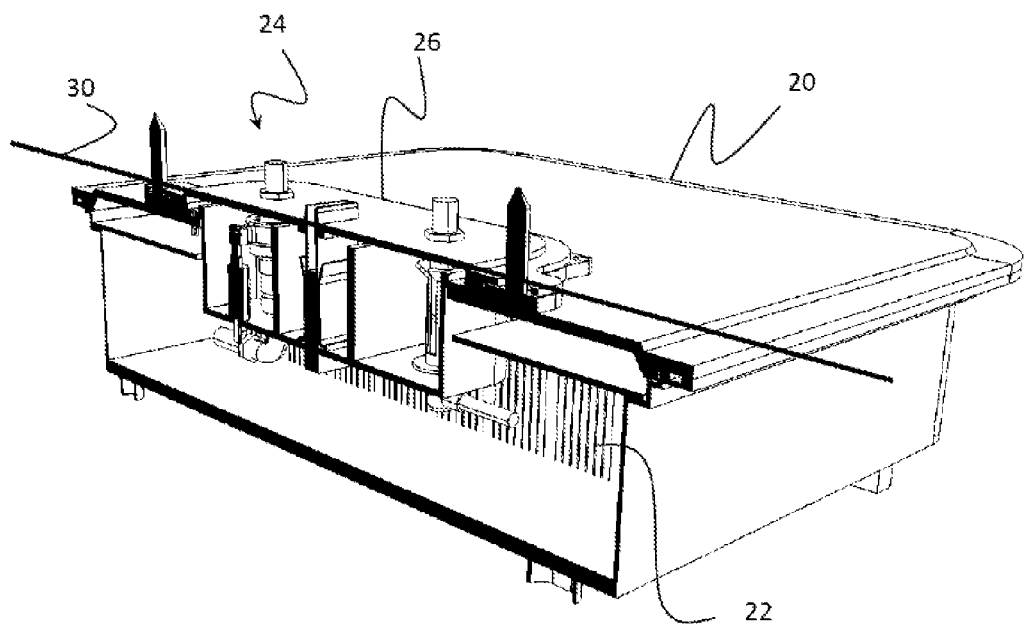
FIG. 6 is a schematic perspective cross-sectional illustration of the battery module assembly for the vehicle of FIGS. 1-5.
Figure 7:
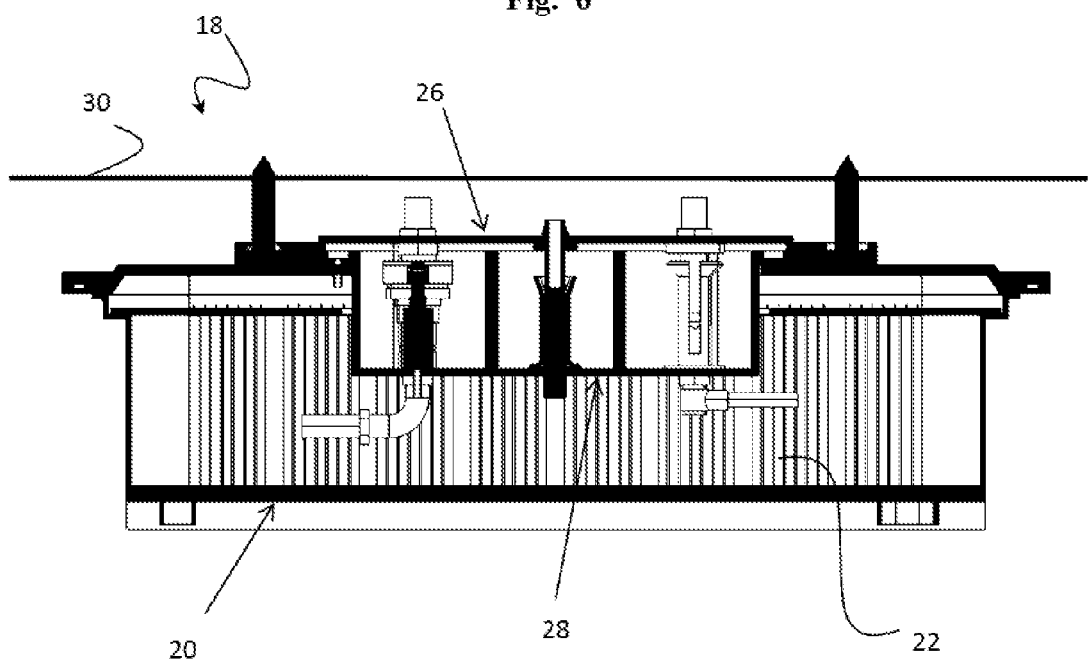
FIG. 7 is a schematic side cross-sectional illustration of the battery module assembly for the vehicle of FIGS. 1-6.
Figure 8:
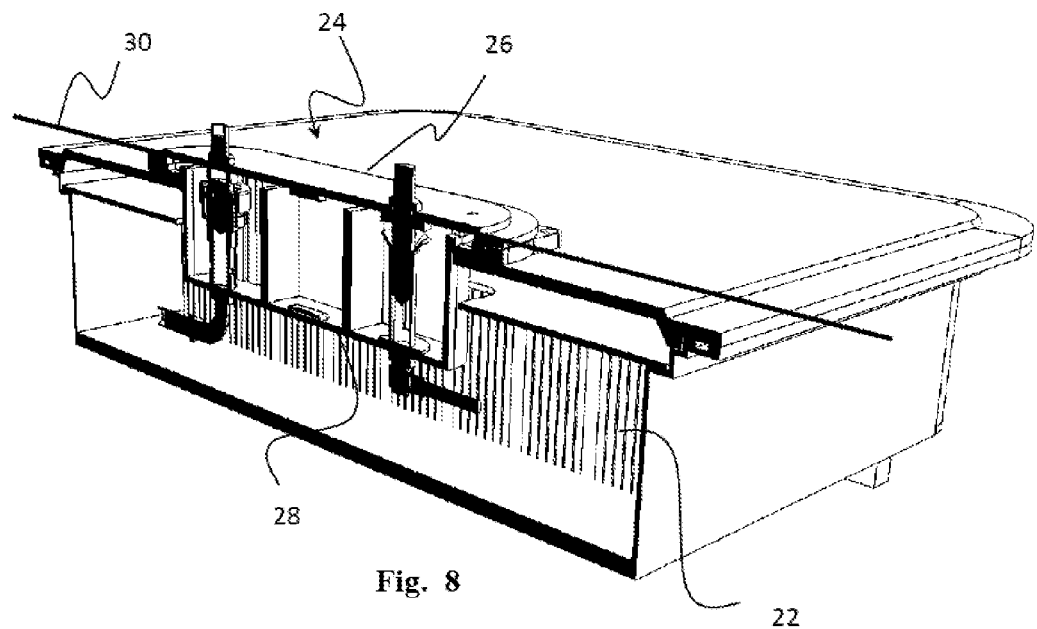
FIG. 8 is a schematic perspective cross-sectional illustration of the battery module assembly for the vehicle of FIGS. 1-7.
Figure 9:
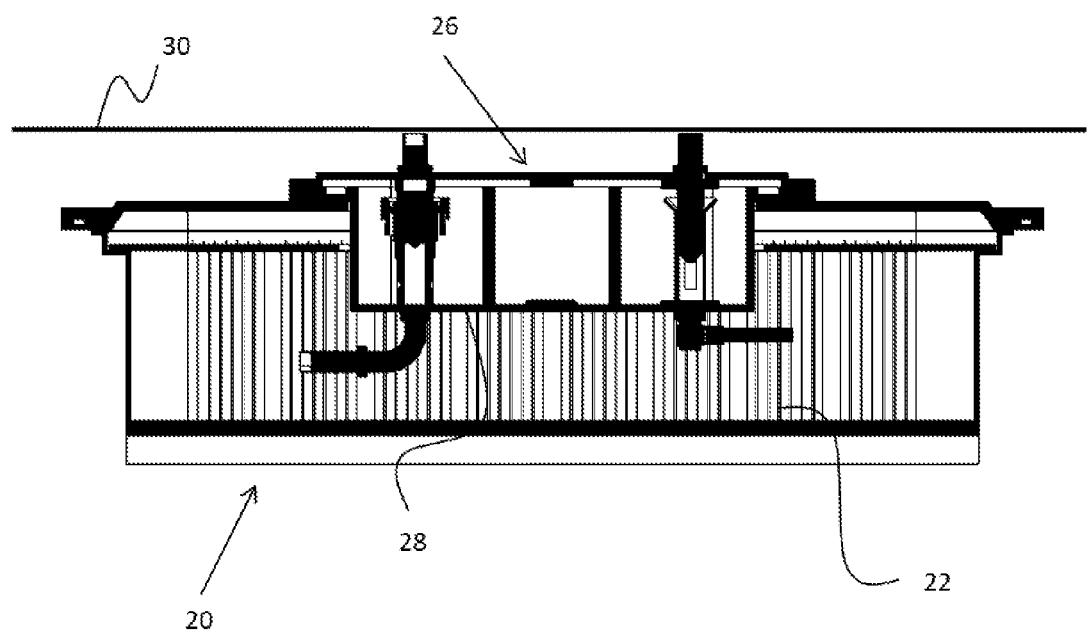
FIG. 9 is a schematic side cross-sectional illustration of the battery module assembly for the vehicle of FIGS. 1-8.
Figure 12:
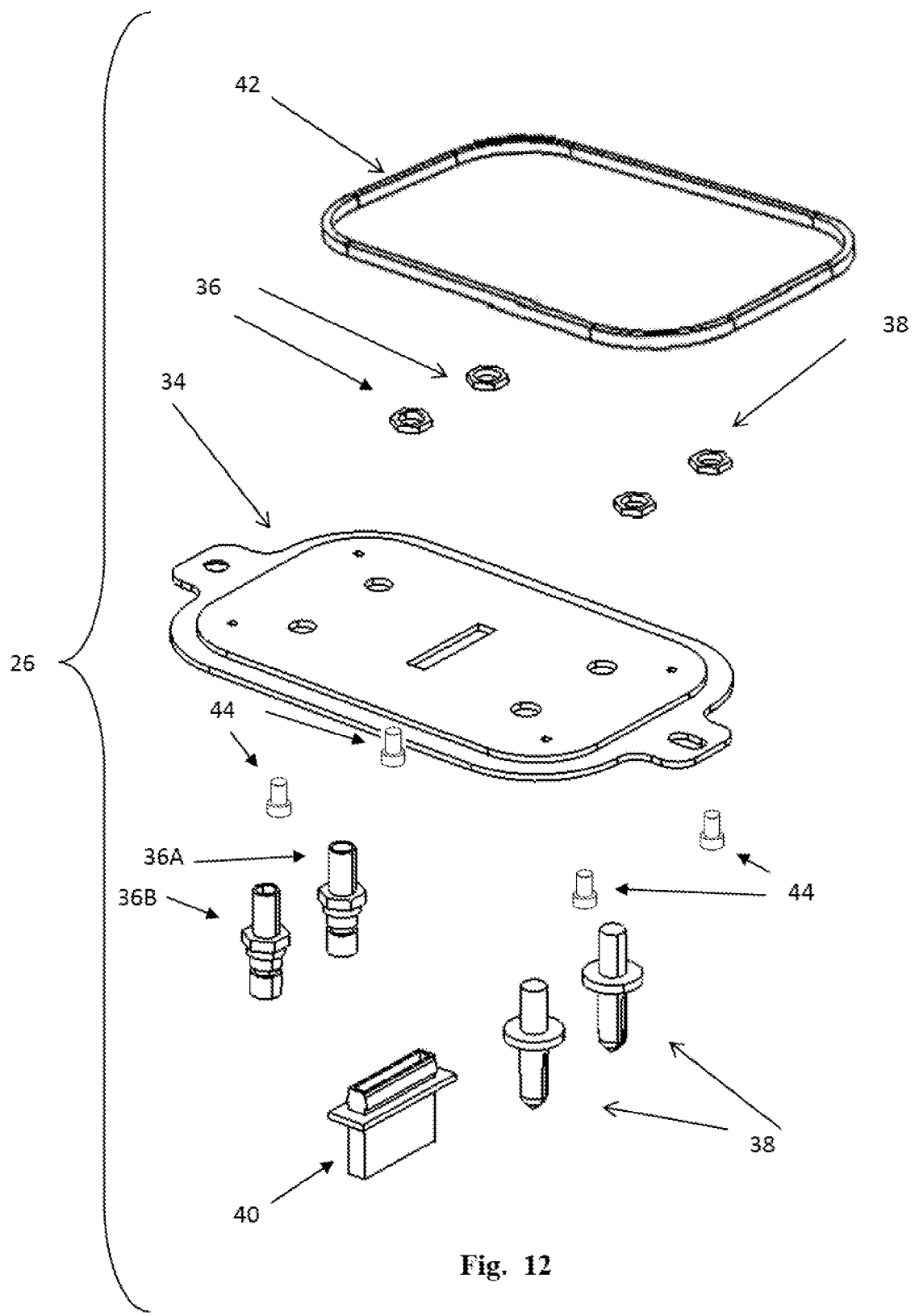
FIG. 12 is a perspective exploded schematic illustration of the first portion of the connector assembly for the battery module assembly of FIGS. 1-11.
Figure 13:
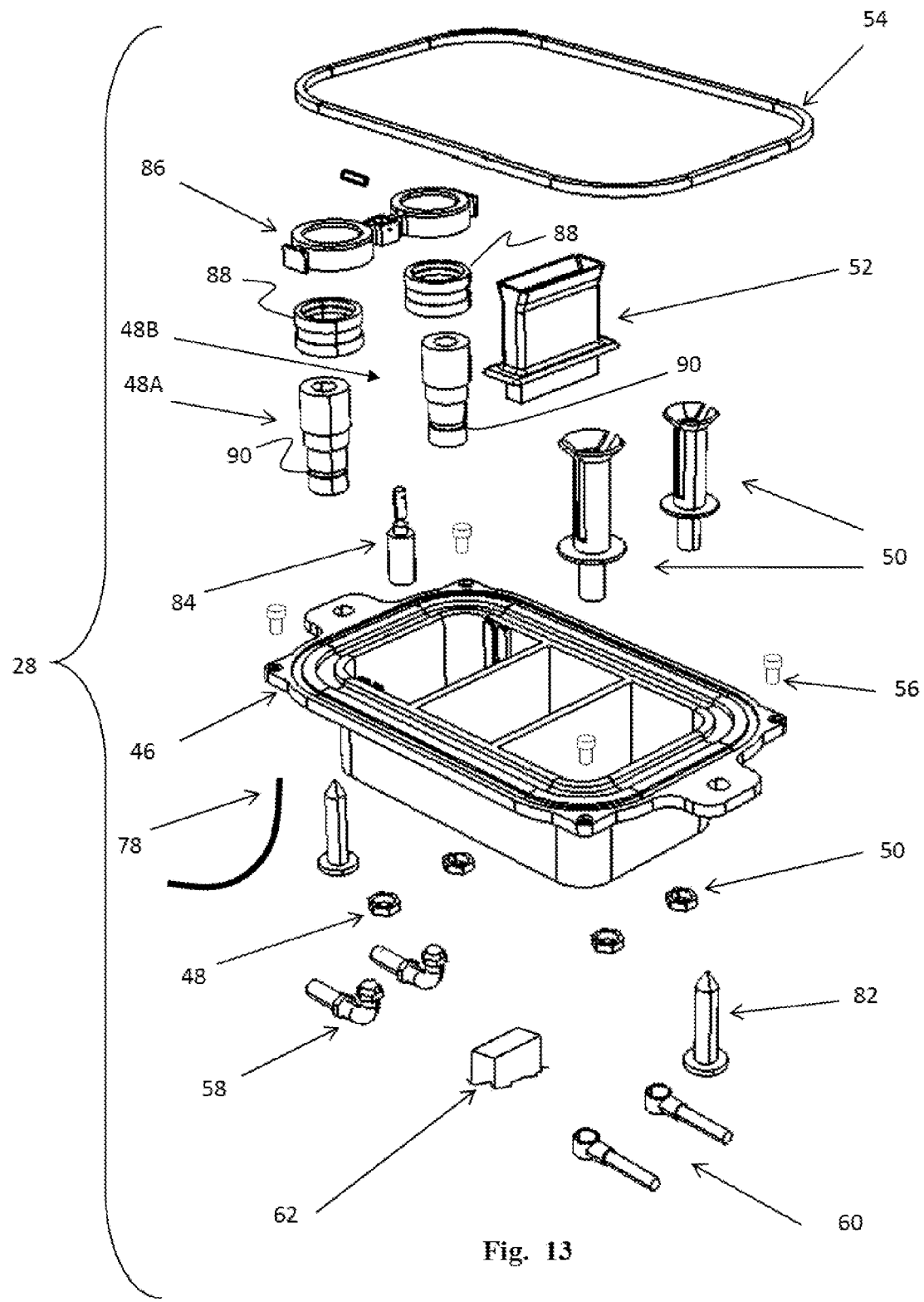
FIG. 13 is a perspective exploded schematic illustration of the second portion of the connector assembly for the battery module assembly of FIGS. 1-11.

Referring to the Figures, wherein like reference numbers refer to the same or similar components throughout the several views, FIG. 1 schematically illustrates a vehicle 10 including at least one motor 12, a least one generator 14 and an energy storage system (ESS) 16. The ESS 16 includes a battery module assembly 18.

Referring to FIGS. 2-9 the battery module assembly 18 is described in further detail. The battery module assembly 18 includes a battery box 20 in which a plurality battery packs 22 are located. The battery module assembly 18 also includes a connector assembly 24. The connector assembly 24 includes a first portion 26, which is secured to the vehicle 10 and a second portion 28, which is secured to the battery box 20. The first portion 26 of the connector assembly 24 mates with the second portion 28 of the connector assembly 24. In the embodiment shown, the first portion 26 is a male portion of the connection assembly 24 and the second portion 28 is a female portion of the connector assembly 24. The connector assembly 24 allows the battery box 20 to be quickly and easily connected and disconnected from the vehicle 10. As explained below, the connector assembly 24 provides commonly mating electrical, fluid and information connections between the first portion 26 and the second portion 28. Additional electrical, fluid and information connections that are specific to a battery type may be located within the battery box 20 between the battery packs 22 and the second portion 28 of the connector assembly 24. Additionally, the size of the battery box 20 may vary as required by the type and number of battery packs 22 located within, while the connector assembly 24 remains a common size and arrangement. Therefore, the connector assembly 24 provides a common connection that can be quickly connected and disconnected such that the battery box 20 portion of the battery module 18 may be easily installed and removed on the vehicle 10.

The arrangement of the battery module 18 having the connector assembly 24 also assists in manufacturing of the vehicle 10 because all of the connections between the battery box 22 and the vehicle 10 are included in the connector assembly 24. The battery box 20 portion of the battery module assembly 18 may be assembled remotely from the vehicle 10 and the second portion 28 of the connector assembly 24 may be assembled onto the vehicle 10. Thus, allowing assembly of the battery box 20 onto the vehicle 10 at the time of manufacture to be quickly accomplished.

In the embodiment shown, the first portion 26 of the connector assembly 24 is secured to a chassis 30 for the vehicle 10. The battery module assembly 18 may be further supported and protected by a battery module tray 32 which is located beneath the battery module 18 when the battery module assembly 18 is secured within the vehicle 10. The battery module tray 32 may be removed for easy access to the battery module assembly 18.

Referring to FIGS. 10-16C the connector assembly 24 is described in further detail. The first portion 26 of the connector assembly 24 includes a first housing portion 34. The first housing portion 34 includes a first pair of fluid connectors 36, a first pair of high voltage electrical connectors 38, a general electrical connector 40. Additionally, a first seal 42 and a first plurality of mechanical fasteners 44 are included to assist in securing and sealing the first portion 26 to the second portion 28 of the connector assembly 24.

Likewise, the second portion 28 of the connector assembly 24 includes a second housing portion 46. The second housing portion 46 includes a second pair of fluid connectors 48, a second pair of high voltage electrical connectors 50, a second general electrical connector 52. A second seal 54 and a second plurality of mechanical fasteners 56 assist in securing and sealing the second portion 28 to the first portion 26 of the connector assembly 24.

The first pair of fluid connectors 36 mate with the second pair of fluid connectors 48. The first pair of fluid connectors 36 are male fluid connectors and the second pair of fluid connectors 48 are female fluid connectors. The second pair of fluid connectors 48 are also secured to fluid conduits 58 within the battery box 20 for heating and cooling of the battery module assembly 18. Fluid is transferred from the hydraulic system (not shown) for the vehicle 10 through the first pair of fluid connectors 36 and the second pair of fluid connectors 48 to the fluid conduits 58. The type of fluid conduits 58 which connect to the second pair of fluid connectors 48 may vary depending upon the type of battery packs 22 located within the battery box 20. Additionally, depending on the type of battery packs 22 located within the battery box 20, a fluid connection for heating and cooling the battery packs 22 may not be necessary.

One of the first pair of fluid connectors 36 and one of the second pair of fluid connectors 48 provides for flow into the battery box 20. The other of the first pair of fluid connectors 36 and the other of the second pair of fluid connectors 48 provides for flow out the battery box 20. Thus, the first pair of fluid connectors 36 and the second pair of fluid connectors 48 provides a hydraulic circuit for heating and cooling the battery packs 22 within the battery box 20. The first pair of fluid connectors 36 and the second pair of fluid connectors 48 are quick connecting mechanical fittings which provide a sealed connection that can be utilized for pressurized fluid flow, as described below. The first pair of fluid connectors 36 and the second pair of fluid connectors 48 allow the battery module assembly 18 to be quickly connected and disconnected from the hydraulic system (not shown) for the vehicle 10 to provide heating and cooling for the battery module assembly 18.

The first pair of high voltage electrical connectors 38 mates with the second pair of high voltage electrical connectors 50. The first pair of high voltage electrical connectors 38 are male high voltage electrical connectors and the second pair of high voltage electrical connectors 50 are female fluid connectors. In the embodiment shown, the first pair of high voltage electrical connectors 38 and the second pair of high voltage electrical connectors 50 are common bayonet style connectors. The second pair of high voltage electrical connectors 50 are also secured to high voltage electrical conduits 60 within the battery box 20 for transferring power to and from the battery packs 22 of the battery module assembly 14 to the vehicle 10. Power is transferred from the battery packs 22 through the first pair of high voltage electrical connectors 38 and the second pair of high voltage electrical connectors 50 to the vehicle 10, most specifically to and from the motor 12 and the generator 14. One of the first pair of high voltage electrical connectors 38 and one of the second pair of high voltage electrical connectors 50 provides a positive terminal. The other of the first pair of high voltage electrical connectors 38 and the other of the second pair of high voltage electrical connectors 50 provides a negative terminal. Thus, the first pair of high voltage electrical connectors 38 and the second pair of high voltage electrical connectors 50 provides an electrical circuit for transferring power to and from the battery packs 22 within the battery box 20. The first pair of high voltage electrical connectors 38 and the second pair of high voltage electrical connectors 50 allow the battery module assembly 18 to be quickly connected and disconnected from the vehicle 10 to provide storage within the battery packs 22.

A third pair of high voltage electrical connectors (not shown) may also be located within the second housing portion 28. The third pair of high voltage electrical connectors (not shown) may be utilized to provide a connection for charging the battery packs 22 at a battery charging station that is remote from the vehicle 10

The first general electrical connector 40 mates with the second general electrical connector 52. The first general electrical connector 40 is a male electrical connector and the second general electrical connector 52 is a female electrical connector. The second general electrical connector 52 is also secured to a general electronics cable 62 within the battery box 20 for transferring information to and from the battery module assembly 18 to the vehicle 10. Information is transferred from the battery module assembly 18 through the first general electrical connector 40 and the second general electrical connector 52 to the vehicle 10, most specifically to the electronic control unit (not shown) for the vehicle 10. The first general electrical connector 40 and the second general electrical connector 52 preferably are serial bus connectors. The first general electrical connector 40 and the second general electrical connector 52 provides information to the vehicle 10 including battery charge information, battery temperature information, battery pack 22 type, battery box 20 service information, etc. The first general electrical connector 40 and the second general electrical connector 52 allow the battery module assembly 18 to be quickly connected and disconnected from the vehicle 10.

In the embodiment described above all the male connectors are associated with the first portion 26 and all of the female connectors are associated with the second portion 28. However, the female connectors may be located on the first portion 26 and the male connectors may be located on the second portion 28, or the male and female connectors may be mixed between the first portion 26 and the second portion 28. One skilled in the art would be able to determine the most suitable male/female connector arrangements for a particular battery module assembly 18.

Figure 14:
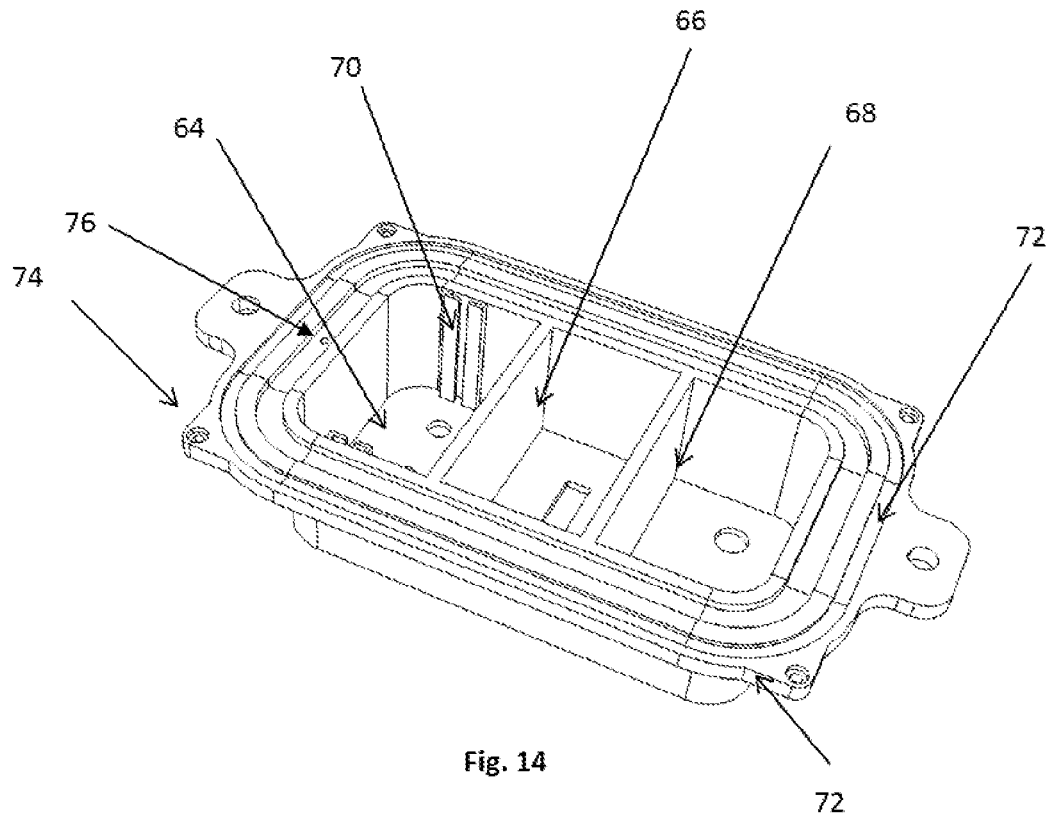
FIG. 14 is a first perspective schematic illustration of the second portion of the connector assembly for the battery module assembly of FIGS. 1-11.
Figure 15:
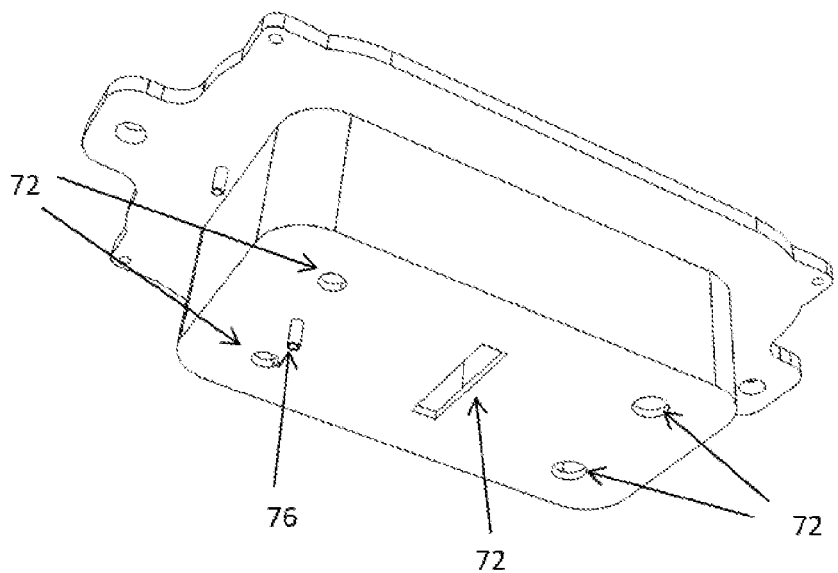
FIG. 15 is a second perspective schematic illustration of the second portion of the connector assembly for the battery module assembly of FIGS. 1-11.
Figure 17:
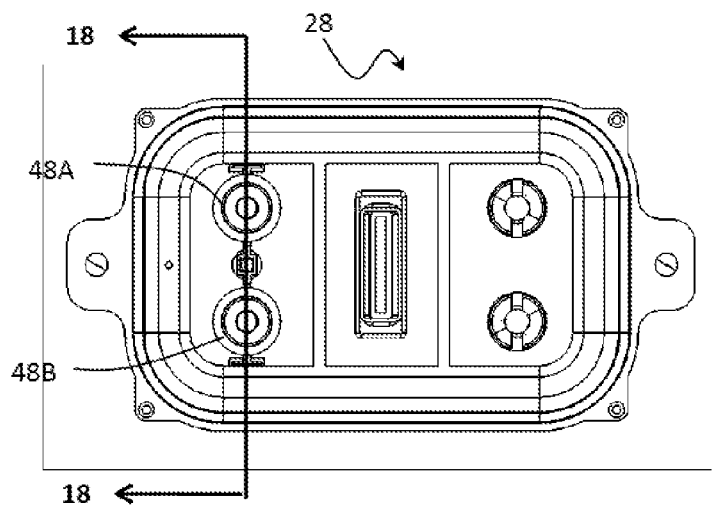
FIG. 17 is a second top view schematic illustration of the connector assembly for the battery module assembly of FIGS. 1-15.
Figures 18A, 18B:
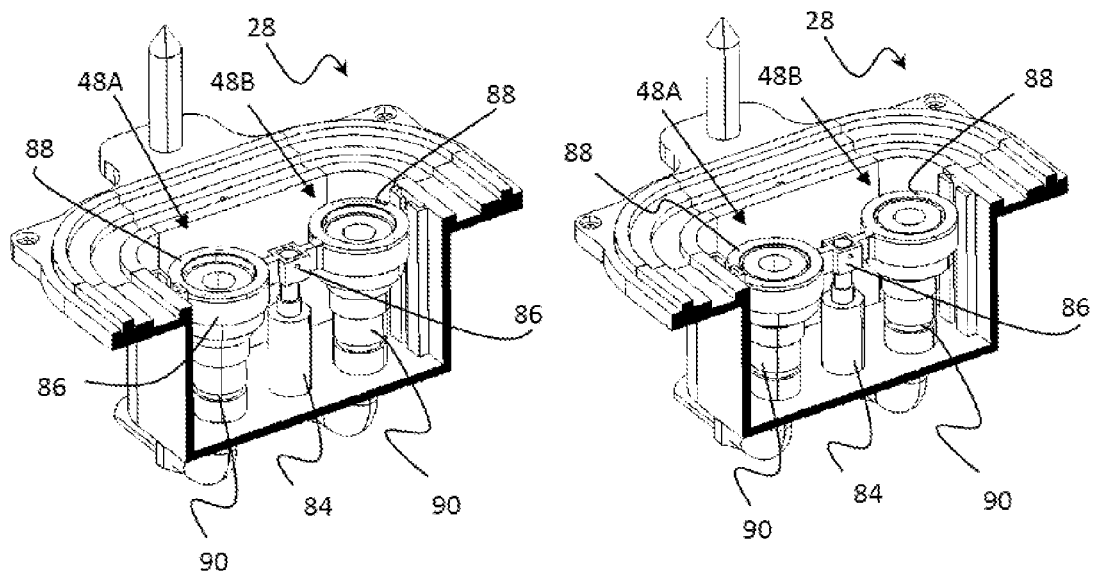
FIG. 18A is a second cross-sectional perspective schematic illustration of the second portion of the connector assembly for the battery module assembly of FIG. 17 taken along line 18-18 illustrating the fluid connectors in a locked position.
FIG. 18B is a second cross-sectional perspective schematic illustration of the second portion of the connector assembly for the battery module assembly of FIG. 16 taken along line 18-18 illustrating the fluid connectors in a unlocked position.

As shown in FIG. 14, the second housing portion 46 may also be divided into a hydraulic chamber 64, a general electrical chamber 66, and a high voltage electrical chamber 68. The hydraulic chamber may include actuator guides 70 to assist in operation of the quick connect fluid connectors, 36, 38, as described below. Attachment bores 72 may also be formed in the second housing portion 46 to allow for the second pair of fluid connectors 48, second pair of high voltage electrical connectors 50, second general electrical connector 52, and the second plurality of mechanical fasteners 56. Additionally, the second housing portion 46 may define a groove 74 to receive the second seal 54, and define at least one water drain 76. A drainage tube 78 may be attached to the water drain 76 to remove fluid from the water drain 76 to assist in sealing the connector assembly 24 from external fluids or attached to the second housing portion 46 to drain fluids such as coolant that may escape during connecting/disconnecting of the battery box 20 to the vehicle 10.

Referring to FIGS. 10 and 11, the connector assembly 24 further includes a first pair of locators 80 located on the first housing portion 34 and second pair of locators 82 located on the second housing portion 46. When the second housing portion 46 is connected to the first housing portion 34 the second pair of locators 82 are aligned with the first pair of locators 80. Alignment of the first and second pair of locators 80 and 82 ensures that the first and second pair of fluid connectors 36 and 48, the first and second pair of the high voltage electrical connectors 38 and 50, the first and second general electrical connectors 40 and 52, and the first and second plurality of mechanical connectors 44 and 56 are all aligned with one another. In this manner, the first portion 26 and the second portion 28 may be easily connected and disconnected to one another to connect the fluid and electrical connections of the battery module assembly 18.

Referring to FIGS. 13 and 17-18B, the connection between the first pair of fluid connectors 36 and the second pair of fluid connectors 48 is further described. The first pair of fluid connectors 36 includes a fluid input connector 36A and a first fluid output connector 36B. Likewise, the second pair of fluid connectors 48 includes a second fluid input connector 48A and a second fluid output connector 48B. When the first pair of fluid connectors 36 are connected to the second pair of fluid connectors 48 fluid from the vehicle cooling system (not shown) flows in the battery module assembly 18 through the first fluid input connector 36A and the second fluid input connector 48A. Additionally, fluid flows from the battery box 20 back to the vehicle 10 through the first fluid output connector 36B and the second fluid output connector 48B.

The fluid cooling system for the vehicle 10 is pressurized. Therefore, the battery module assembly 18 must be pressurized as well prior to assembly onto the vehicle 10. The second pair of fluid connectors 48 are mechanical fittings. An electromechanical device, such as a solenoid actuator 84 is mounted within the second housing portion 46. When the second pair of high voltage electrical connectors 50 contact the first pair of high voltage electrical connectors 38 a signal is sent to the solenoid actuator 84 to actuate the second pair of fluid connectors 48. The solenoid actuator 84 is connected to an actuator link 86 which moves within the actuator guides 70. Movement of the actuator link 86 translates a pair of sliding sleeves 88 on the second pair of fluid connectors 48 to move relative to a main body 90 of the second pair of fluid connectors 48 to move from a locked position (shown in FIG. 18A) to an unlocked position (shown in FIG. 18B). Movement of the sliding sleeves 88 relative to the main body 90 releases a lock (not shown) within the main body 90 of the second pair of fluid connectors 48. For example, the lock (not shown) may be a pair of ball bearings located within the main body 90 of the second pair of fluid connectors 48 which are spring loaded to engage a groove on the first pair of fluid connectors 36 when the solenoid actuator 84 is deactivated. Actuation of the solenoid actuator 84 may release the loading on the ball bearings to allows movement of the first pair of fluid connectors 36 relative to the second pair of fluid connectors 48

The first pair of fluid connectors 36 may then be inserted within the second pair of fluid connectors 48. Once the first pair of fluid connectors 36 are seated the solenoid actuator 84 is deactivated. The sliding sleeves 88 translate relative to the main body 90 back to the original position (the locked position shown in FIG. 18A) and the lock is reengaged to retain the first pair of fluid connectors 36 within the second pair of fluid connectors 48. Thus, the first pair of fluid connectors 36 and the second pair of fluid connectors 48 are mechanically secured together.

To remove the battery box 20 from the vehicle 10 a release switch (not shown) may be activated. The release switch actuates the solenoid actuator 84 to disengaged the ball lock and allow the battery box 20 to be removed from the vehicle 10. The fluid pressure within the battery box 20 would need to be recalibrated prior to reattachment to the vehicle 10.

Figure 19A:
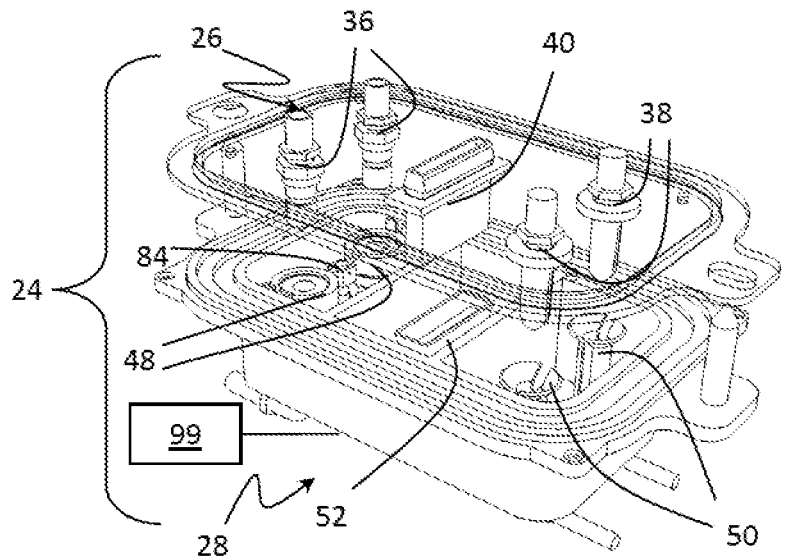
FIG. 19A is a first exploded perspective schematic illustration of the first and second portions of the connector assembly for the battery module assembly of FIGS. 1-18B.
Figure 19B:
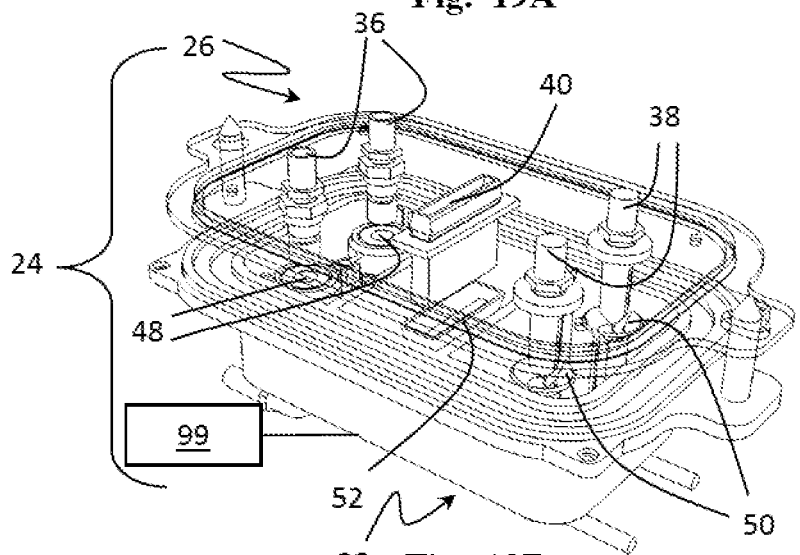
FIG. 19B is a second perspective schematic illustration of the first and second portions of the connector assembly for the battery module assembly of FIGS. 1-19A.
Figure 19C:
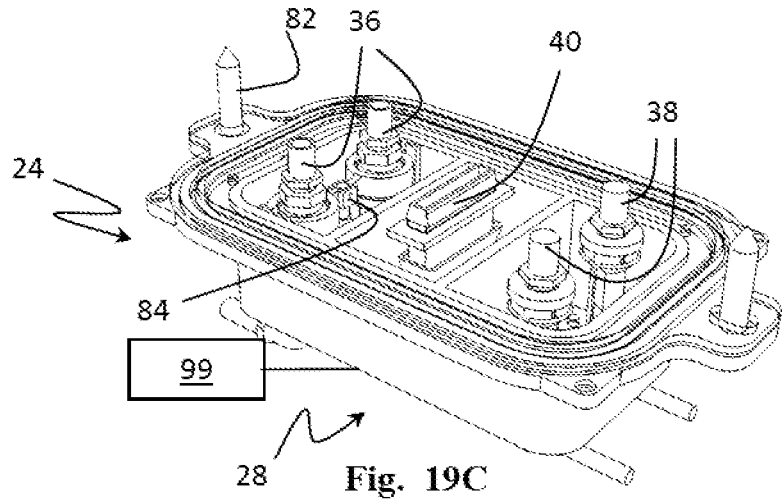
FIG. 19C is a third perspective schematic illustration of the first and second portions of the connector assembly for the battery module assembly of FIGS. 1-19B.
Figure 20:
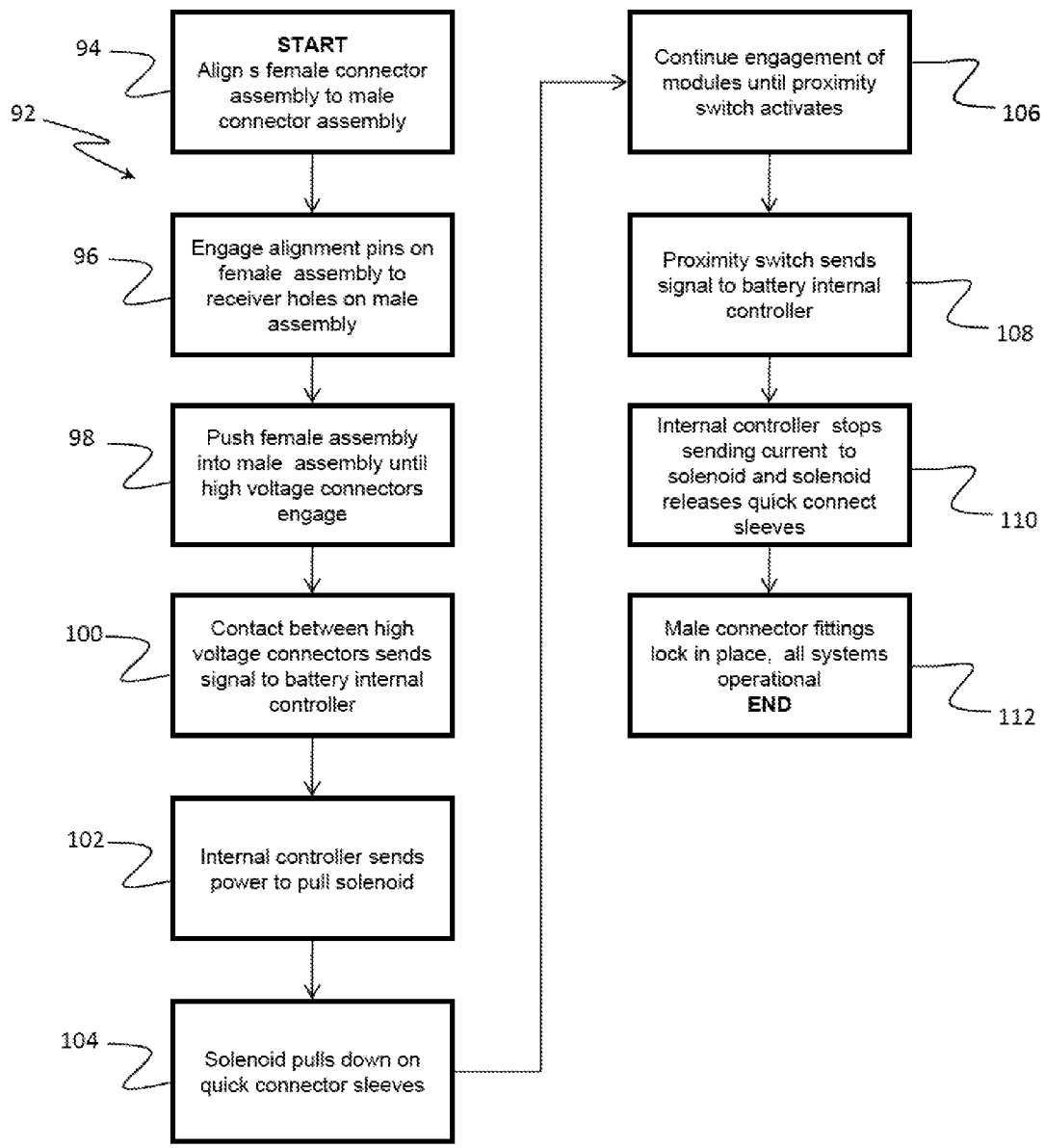
FIG. 20 is a schematic illustration of a first embodiment of a method of connecting the connector assembly for the battery module assembly of FIGS. 1-19C.

An embodiment, shown at 92 in FIG. 20, for a method of connecting the second portion 28 to the first portion 26 is discussed with reference to FIGS. 19A-20. The second portion 28 is aligned within the first portion 26, step 92. The second pair of locators 82 are aligned within the first pair of locators 80, step 96. The second pair of high voltage connectors 50 make electrical contact with the first pair of high voltage electrical connectors 38, step 98. The contact between the first and second pair of high voltage electrical connectors 38 and 50 initiates a signal to a controller 99 for the battery module assembly 18, step 100. The battery module assembly 18 controller 99 actuates the solenoid actuator 84, step 102. The solenoid actuator 84 moves the sliding sleeves 88 to the unlocked position (shown in FIG. 18B), step 104. The first pair of high voltage electrical connectors 38 are fully seated on the second pair of high voltage electrical connectors 50, step 106. A signal is sent to the controller 99, step 108. The controller 99 disengages the solenoid actuator 84, step 110. The sliding sleeves 88 move back to the locked position (shown in FIG. 18A) and the first and second pair of fluid connectors 38 and 50 are locked together, step 112)

Figure 21:
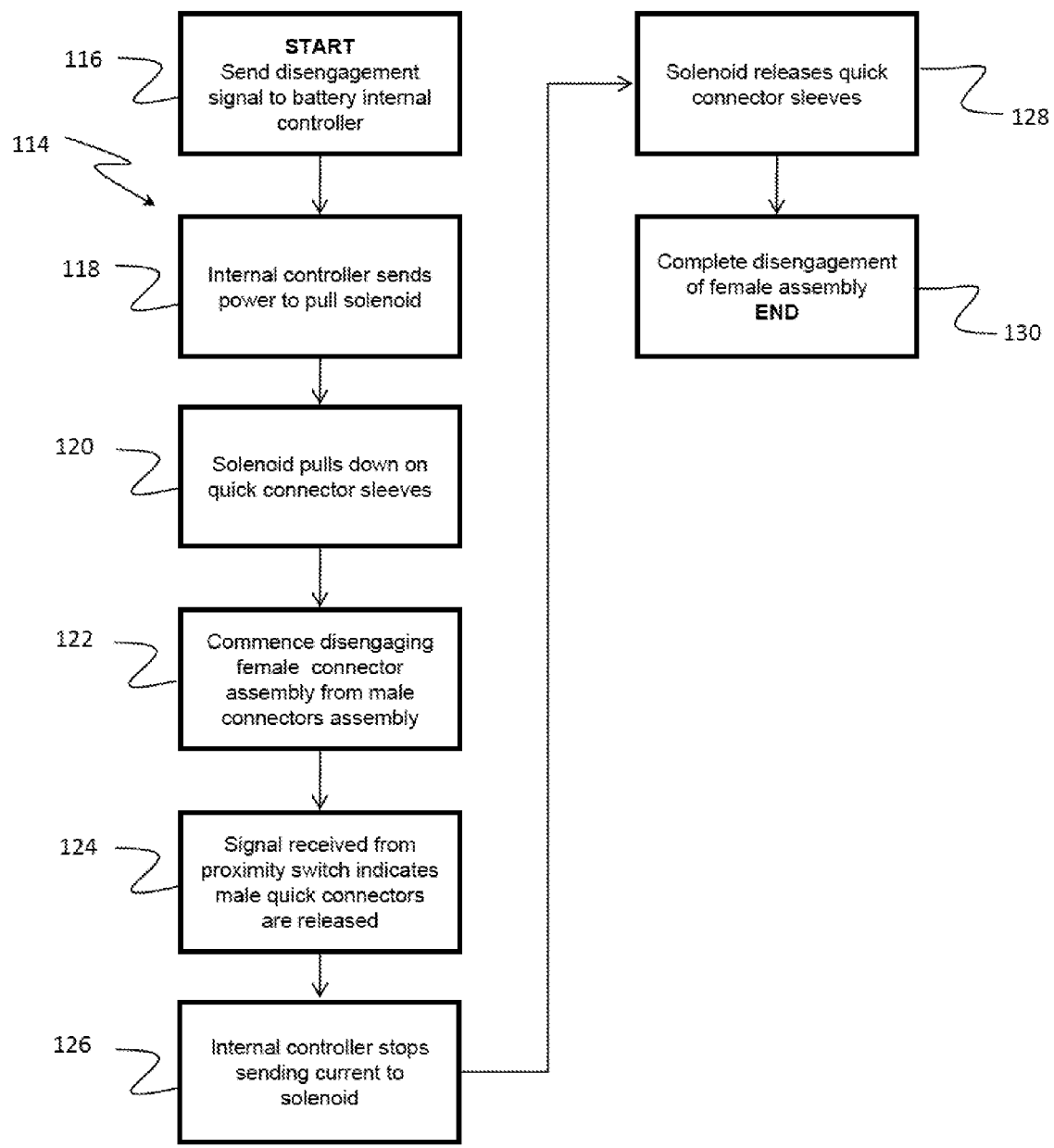
FIG. 21 is a schematic illustration of a first embodiment of a method of disconnecting the connector assembly for the battery module assembly of FIGS. 1-19C.

An embodiment, shown at 114 in FIG. 21, for a method of disconnecting the second portion 28 to the first portion 26 is discussed with reference to FIGS. 19A-C and 21. A signal is sent to the controller 99 to actuate the solenoid valve 84, step 116. The controller 99 actuates the solenoid actuator 84, step 118. The solenoid actuator 84 moves the sliding sleeves 88 to the unlocked position (shown in FIG. 18B), step 120. The second portion 28 is removed from the first portion 26, step 122. The disconnection of electrical contact between the first and second pair of high voltage electrical connectors 38 and 50 initiates a signal to the battery module 18 controller 99, step 124. The controller 99 disengages the solenoid actuator 84, step 126. The sliding sleeves 88 move back to the locked position (shown in FIG. 18A) step 128. The first portion 26 and the second portion 28 of the connector assembly 24 are disconnected from one another, step 130.

Figure 22:
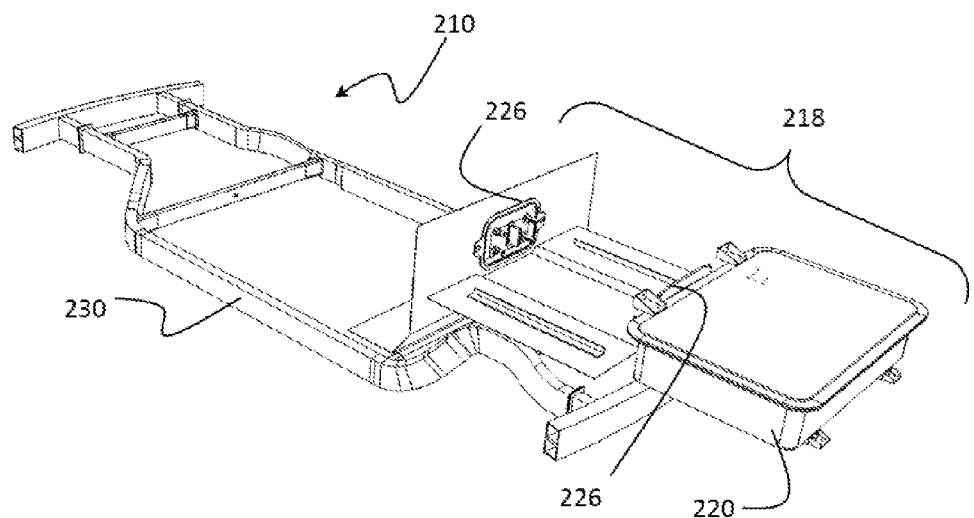
FIG. 22 is a first perspective schematic illustration of a second embodiment of a battery module assembly having connector assembly for the vehicle of FIG. 1.
Figure 22A:
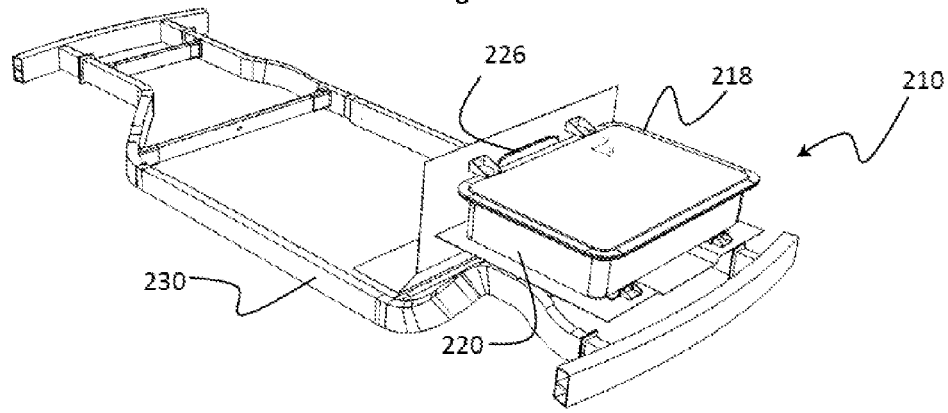
FIG. 22A is a first perspective schematic illustration of a second embodiment of a battery module assembly having connector assembly for the vehicle of FIGS. 1 and 22.
Figure 22B:
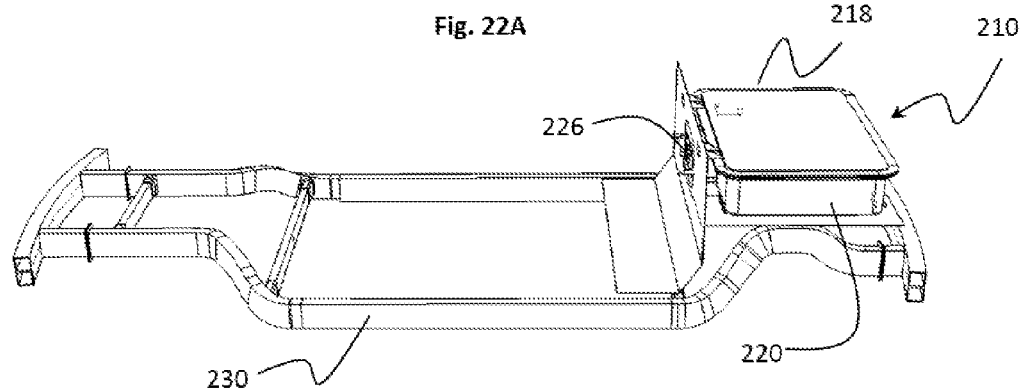
FIG. 22B is a first side perspective schematic illustration of a second embodiment of a battery module assembly having connector assembly for the vehicle of FIGS. 1, 22 and 22A.

Referring to FIGS. 22-22B as second embodiment of a battery module assembly 218 is discussed. The battery module assembly 218 includes a connector assembly 224 having a first portion 226 and a second portion 228. The first portion 226 is secured to a chassis 230 for a vehicle 210. The first portion is secured in a vertical orientation relative to the chassis 230. The second portion 228 is secured to a battery box 220 for the battery module assembly 218. The second portion 228 has a vertical orientation relative to the battery box 222. The battery box 222 is supported on the chassis 230. The connector assembly 224 may have a similar arrangement and method of connection as that described above.

While the best modes for carrying out the invention have been described in detail, those familiar with the art to which this invention relates will recognize various alternative designs and embodiments for practicing the invention within the scope of the appended claims.

The invention claimed is:

1. A method of connecting a battery module to a vehicle comprising:
   aligning a first portion of the battery module and a second portion of the battery module such that a first locator on the first portion of the battery module is aligned with a corresponding second locator on the second portion of the battery module;
   moving the second portion of the battery module toward the first portion of the battery module; and
   applying pressure to the second portion of the battery module for
      securing the second portion of the battery module to the first portion of the battery module by:
         mating a first pair of high voltage electrical connectors with a second pair of high voltage electrical connectors, and
         mating a first general electrical connector with a second general electrical connector, wherein the applying pressure to the second portion of the battery module
      step further comprises:
   applying pressure until a first pair of fluid connectors mate with a second pair of fluid connectors; and
   activating a solenoid actuator operably connected to the second pair of fluid connectors for
      releasing a mechanical lock associated with the second pair of fluid connectors when pressure is applied to the second portion of the battery module for
         mating the first pair of fluid connectors with the second pair of fluid connectors; further comprising the step of
   connecting the solenoid actuator to an actuator link; movably-arranging the actuator link within an actuator guide for effecting translating movement of the actuator link to a pair of sliding sleeves arranged on the second pair of fluid connectors relative to a main body of the second pair of fluid connectors for executing the activating step; and releasing the mechanical lock.

2. The method of claim 1, wherein the activating the solenoid actuator step occurs upon contacting the second pair of high voltage electrical connectors with the first pair of high voltage electrical connectors.

3. The method of claim 1 further comprising:

utilizing a proximity sensor for
 indicating that the first pair of fluid connectors and the second pair of fluid connectors are fully engaged with one another for
 de-activating the solenoid actuator.

4. The method of claim 1, further comprising the step of:

arranging the solenoid actuator within the second portion of the battery module.

5. The method of claim 1, wherein after the step of mating the first pair of high voltage electrical connectors with the second pair of high voltage connectors and before the step of activating the solenoid actuator, further comprising the step of:

sending a signal to the solenoid actuator to actuate the second pair of fluid connectors.

6. The method of claim 1, further comprising the step of:

arranging the mechanical lock within the main body of the second pair of fluid connectors, wherein the lock includes a pair of spring-loaded ball bearings arranged within the main body of the second pair of fluid connectors.

7. The method of claim 6, further comprising the step of:

deactivating the solenoid actuator for causing the spring-loaded ball bearings to engage a groove formed by the first pair of fluid connectors.

8. The method of claim 7, further comprising the step of:

actuating the solenoid actuator for causing the spring-loaded ball bearings to disengage a groove formed by the first pair of fluid connectors.

\* \* \* \* \*